June 25, 1929.　　G. S. DUNBAR ET AL　　1,718,897

MEASURING DEVICE

Filed Nov. 26, 1926

George S. Dunbar.
Samuel R. Scholes
INVENTOR.

BY
ATTORNEYS.

Patented June 25, 1929.

1,718,897

UNITED STATES PATENT OFFICE.

GEORGE S. DUNBAR AND SAMUEL R. SCHOLES, OF COLUMBUS, OHIO, ASSIGNORS TO THE FEDERAL GLASS COMPANY, OF COLUMBUS, OHIO, A CORPORATION OF OHIO.

MEASURING DEVICE.

Application filed November 26, 1926. Serial No. 150,811.

Our invention relates to measuring receptacles and has to do particularly with the provision of a measuring receptacle which is preferably made of glass and which embodies several novel features calculated to facilitate the measuring and pouring of liquids or semi-liquids particularly in household work. It embodies several features of advantage which would also be applicable to the measuring and pouring of solids.

One of the objects of our invention consists in the provision of a measuring receptacle which may be utilized to effect measuring and pouring with a minimum amount of manipulation by the user. In other words, we aim to provide a measuring receptacle in order that both the measuring operation and the pouring operation may be performed with simplicity and a minimum of effort.

One feature of our invention which simplifies the measuring operation consists in the provision of calibrations upon the interior of the receptacle. By this feature, the user may readily observe the relation of the contents of the receptacle to any calibration by looking directly down into the receptacle. This is further facilitated by using a flared measuring receptacle and by providing a plurality of main measuring lines extending entirely around the measuring receptacle and intermediate short measuring lines with a plurality of such short lines for each selected quantity.

Another features of our invention which greatly simplifies the pouring operation consists in the provision of a plurality of pouring lips located at spaced points upon the upper edge of the receptacle. These pouring lips are rendered particularly useful due to the fact that the receptacle is not provided with a handle. The result is that the user may pick up the measuring receptacle and pour from either side thereof or from the front thereof without the necessity of manipulating the receptacle to any particular position.

A further feature of our invention resides in the fact that the capacity of the receptacle is independent of the bottom thickness, due to the graduations being on the interior surface. Likelihood of inaccuracy is, thus, reduced to a minimum.

An embodiment of our invention is illustrated in the drawings wherein similar characters of reference designate corresponding parts and wherein Figure 1 is a top view of our glass vessel showing the plurality of pouring lips and the measuring lines and calibrations upon the interior thereof.

Figure 1:
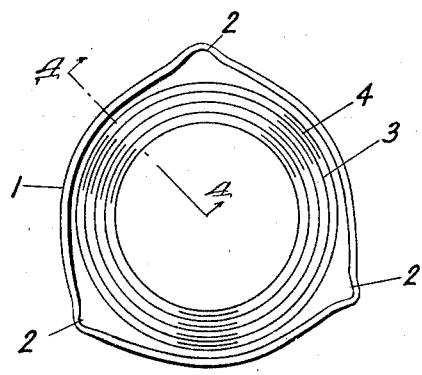

In the drawings, the numeral 1 designates a glass vessel adapted for measuring liquids or semi-liquids constructed in accordance with our invention. The glass vessel comprises a body portion 1 having a plurality of pouring lips 2. Impressed in the inner surface of the glass vessel body portion 1 and extending all around such surface are a plurality of principal graduating lines 3. These lines are shown in this instance as being four in number but a lesser or greater number may be used, depending upon the particular size of the measuring vessel. Such lines are so disposed upon the peripheral surface of the glass vessel as to be suitably spaced apart.

Impressed in the same surface of the body portion at suitable points on such surface are a plurality of short graduating lines 4, each of the said graduating lines being disposed between or intermediate two principal graduating lines 3. The short graduating lines are preferably of equal length and are disposed upon the body portion 1 between the pouring lips 2. The disposition of the short graduating lines with respect to the principal graduating lines upon the principal surface of the body portion 1 results in the formation of the complete measuring scale. A measuring scale is preferably imprinted upon each section of the glass vessel defined by two adjacent lips. In a glass vessel having two pouring lips, two measuring scales are imprinted upon the peripheral surface of the vessel, and in a glass vessel having three pouring lips, three measuring scales are imprinted upon the peripheral surface of the vessel and, so on. The graduating lines consist of exceedingly shallow ridges turned upwardly, thus facilitating cleaning of the receptacle and having no effect upon the complete emptying of said receptacle.

Figure 3:
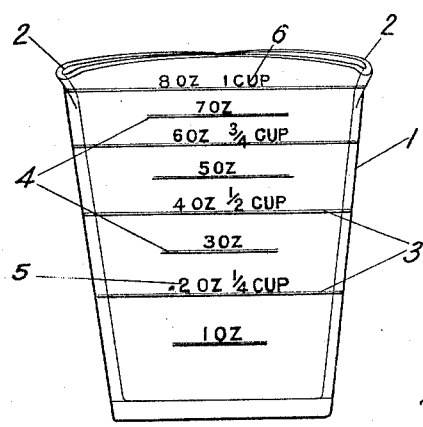
Figure 3 is a side elevational view of the vessel illustrated in Figure 2, showing the disposition of the measuring scale in the section defined by the two adjacent lips.
Figure 4:
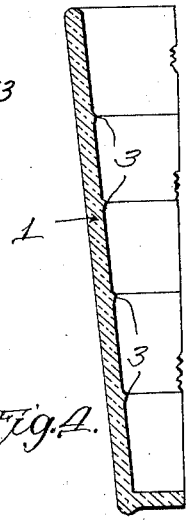
Figure 4 is a section taken on the line 4—4 of Figure 1.
Figure 5:
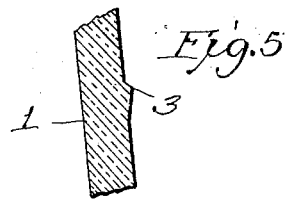
Figure 5 is an enlarged fragmentary section of Figure 4 showing in detail the shape of one of the ridges.

The measuring scale formed by the disposition of short graduating lines 4 between or intermediate the principal graduating lines 3, as pointed out above, also includes units of liquid measure 5 and units of volume measure 6 on the peripheral surface of the vessel 1 at points adjacent each graduating line of the scale, as clearly shown in Figure 3.

Figure 2:
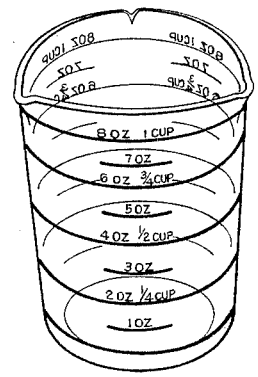
Figure 2 is a perspective view of a glass vessel constructed in accordance with our invention.

It is to be noted that, although the measuring vessel or receptacle shown in Figure 2 comprises three measuring scales imprinted upon the peripheral surface of the vessel, glass measuring vessels comprising more or less measuring scales disposed upon the peripheral surface may be made without departing from the spirit of our invention.

An important feature of our invention has to do with the manufacture of articles of this type. In subjecting such articles to the operation of the melting machine wherein these articles are moved successively through a melting zone, it is important that they be rotated automatically so that they will be uniformly affected by the flame. The fact that a plurality of pouring lips are provided and that the measuring indications extend, to all intents and purposes, entirely around the article, makes possible the automatic application of the lip-forming cup to the article at a period during rotation of such article. In other words, if only one lip and one series of graduations were used, it would be necessary to use great care and to manipulate the article so that the measuring indications would be adjacent the pouring lip. However, with the plurality of pouring lips and the graduations extending substantially around the article, this difficulty does not arise, for, wherever the lips are placed, there will always be measuring indications adjacent to each lip.

Having thus described our invention, what we claim is:

1. A glass receptacle adapted for measuring material comprising a body portion and measuring indications upon the interior surface of said body portion and extending all around said surface, said indications consisting of shallow ridges turned upwardly, said body portion being flared to such a degree as to permit the measuring indications to be seen either by looking directly down into said article or by looking at the exterior thereof.

2. A glass article for measuring material comprising a receptacle flared to such a degree that any part of the interior surface thereof may be seen by looking directly downwardly into the said article, said receptacle having a plurality of pouring lips, a plurality of principal graduating lines in superposed relation on the inner surface of the article consisting of shallow ridges turned upwardly, each of said graduating lines extending all around the inner surface of the article, and measuring indicia on the inner surface adjacent each graduating line, said measuring indicia being readable from the interior of said article.

3. A glass article adapted for measuring material comprising a body portion having more than two pouring lips and measuring indications upon the surface thereof embodying a set of graduations for each of said pouring lips, said body portion being flared to such degree as to permit the measuring indications to be seen either by looking directly down into the said article or by looking at the exterior thereof.

In testimony whereof we hereby affix our signatures.

GEORGE S. DUNBAR.
SAMUEL R. SCHOLES.

CERTIFICATE OF CORRECTION.

Patent No. 1,718,897.  Granted June 25, 1929, to

GEORGE S. DUNBAR ET AL.

It is hereby certified that error appears in the printed specification of the above numbered patent requiring correction as follows: Page 1, line 79, strike out the words "glass vessel"; and that the said Letters Patent should be read with this correction therein that the same may conform to the record of the case in the Patent Office.

Signed and sealed this 6th day of August, A. D. 1929.

(Seal)

M. J. Moore,
Acting Commissioner of Patents.